Patented Nov. 10, 1953

2,658,883

UNITED STATES PATENT OFFICE 2,658,883

STABILIZATION OF CHLOROSULFONATED POLYMERS

Richard E. Brooks and Malcolm A. Smook, Wilmington, Del., assignors to E. I. du Pont de Nemours & Company, Wilmington, Del., a corporation of Delaware No Drawing. Application May 1, 1950, Serial No. 159,384

3 Claims. (Cl. 260—45.8)

This invention relates to stable halogen- and sulfur-containing hydrocarbon polymers and methods for stabilizing them. The invention has special utility in the production of light stable and heat stable chlorosulfonated polymers of ethylene.

It is commonly known that resinous polymerization products formed from vinyl containing compounds undergo certain changes when exposed to light and heat. These changes may result in the loss, by the resin, of important properties such as strength, elasticity and electric-insulating capacities. Furthermore, the resins often discolor upon exposure to light or to heat thus making them unsuitable for certain important technical uses. Stabilizers are necessary for vinyl polymers, in particular vinyl chloride polymers, and a number have been suggested for protecting such polymers from decomposition and degradation due to light and heat. Among those found suitable are pentaerythritol, phenyl-alpha-naphthyl amine, "Stabilan" (a salt of an unsaturated fatty acid), and dibutyl tin dilaurate. These stabilizers, however, are of little, if any value for the stabilization of the chlorosulfonated polymers of ethylene.

The storage life of freshly made, solid chlorosulfonated polymers of ethylene is not very great especially during hot, humid weather. Whereas stabilized polymer remains workable, soft, plastic and light in color for an indefinite period, unstabilized polymer is apt to become so sticky, tough and discolored that it cannot be worked on rubber processing machinery. Moreover, precuring on processing rolls with scorching takes place and heat build-up is excessive. In extreme cases the polymer will flake off or sometimes even stop the machinery. The heat build-up hastens polymer degradation and in some instances sulfur dioxide can be observed as one of the products of the degradation. Moreover, discoloration caused by such degradation makes reproducible color matching impossible even if processing can be accomplished.

Methods are already known for treating certain polymerization products to stabilize them against decomposition upon exposure to heat for long periods under conditions where there exists a tendency for the polymerization products to split off free acids. Compounds of the epoxide group (for example, propylene oxide) have been used for the stabilization of chlorosulfonated hydrocarbon oils but these stabilizers are not effective, a priori, for inhibiting the decomposition of the chlorosulfonated polymers of ethylene.

It is an object of this invention to provide a process for improving the stability of halogen- and sulfur-containing polymers of ethylene. A further object is to provide a process for treating halogen- and sulfur-containing polymers of ethylene after synthesis, whereby the resulting polymers are substantially free of acid decomposition products. Yet another object is to provide a process for incorporating stabilizing agents into chlorine- and sulfur-containing ethylene polymers to permit storage of the polymers after their synthesis and drying without developing undesirable discoloration of the polymer and also without gelling and hydrolyzing the polymer. A further object is to provide new compositions of matter. Other objects and advantages of the invention will appear hereinafter.

The above objects are accomplished in accord with the invention by incorporating in a halosulfonated polymer of ethylene small proportions, for example from 0.01% to 10%, and preferably 0.1% to 1.0% by weight of the polymer, of the stabilizing agents phenyl glycidyl ether and/or alpha-pinene. These agents are compatible with the halosulfonated ethylene polymers and generally with the compounding ingredients used with these polymers during their compounding, milling and curing, the agents having no degrading influence on the properties of such cured products and indeed performing a dual function by their presence in the polymer prior and subsequent to curing.

The stabilizing agent may be incorporated in the aforesaid polymer by any convenient method, e. g. by mixing the agent and polymer together on heated rolls; by dissolving the stabilizer in a solution of the polymer and thereafter evaporating the solvent; by spraying the stabilizer on the comminuted polymer before drying; by adding the stabilizer to a water slurry of the polymer immediately after its isolation from the synthesis reaction mixture; or by suspending the stabilizing agent in a solution containing the polymer, in which solution the stabilizer is not soluble, and precipitating from this solution the polymer in a state of intimate mixture with the stabilizer by adding a liquid which is miscible with the solvent but is itself a non-solvent for the polymer and also a non-solvent for the stabilizer under the conditions of working.

The invention is illustrated by the examples in which parts are by weight unless otherwise indicated.

*Example 1.*—A chlorosulfonated polymer prepared by the method of McQueen (U. S. 2,212,786)

was sprayed with 0.3% by weight of phenyl glycidyl ether before it was dried. An equal portion of polymer was left untreated, and the two samples were stored side by side at 25° C. and 50% relative humidity. Both samples (100 parts) were compounded with 80 parts of calcium carbonate, 20 parts of magnesia, 2.5 parts of "Staybelite" hydrogenated wood rosin, and 1 part of "Tetrone" A, dipentamethylene thiuram tetrasulfide. Mooney scorch curves were plotted using the small rotor, and the minimum plasticities were recorded as 49 for the unstabilized polymer and 50 for the stabilized polymer.

Four weeks later these polymers were subjected to an accelerated storage test consisting of heating the polymer at 65° C. for 40 hours at a humidity of 80%. After this treatment the elastomers were compounded as above, and Mooney curves were again run giving values of 57.5 and 53.5, respectively. These values were compared with similar values obtained after 13 weeks of normal storage, which were 57.0 and 54.5. The figures show that phenyl glycidyl ether is an excellent stabilizer of chlorosulfonated polythene. The test approximates 9–10 weeks of storage at 25° C. and 50% relative humidity.

*Example 2.*—A chlorosulfonated polythene similar to the one above, was isolated in a steam isolating system (See Ludlow U. S. application S. N. 792,886, filed December 20, 1947). The flocculent polymer was slurried in cold water and .3–.5% of alpha-pinene based on the polymer was added to the slurry. The elastomer was subsequently dewatered and dried. The stabilized polymer and an untreated portion of the same batch were compounded as in Example 1 and Mooney curves were run on both samples. Initial minimum plasticity values were 40 and 41.5 for the unstabilized and stabilized samples respectively, while the values after an accelerated test in the first week of storage were 55 and 42, respectively.

Examination after 11 weeks of storage substantiated the results of the accelerated test with values of 57.0 for the untreated polymer and 47.5 for the alpha-pinene stabilized portion.

Mooney scorch curves were plotted from data obtained in tests made with two pieces, 2 inches square by ⅜ inch thick, of the compounded polymer. These pieces were placed in a standard Mooney Viscosimeter at 250° F., the apparatus closed and after one minute the rotor started. Readings were then taken automatically and plotted over a period of fifteen minutes, the minimum figure being considered as the Mooney value of the particular sample.

The invention is applicable to the stabilization of halogen- and sulfur-containing hydrocarbon polymers generally and more particularly the chlorosulfonated polymers of ethylene prepared by the process of the McQueen U. S. Patent 2,212,786 and similar processes. Other high molecular weight hydrocarbons which have been chlorosulfonated may be similarly stabilized, such, for example, as the chlorosulfonated high molecular weight paraffin waxes, microcrystalline wax, rosin, asphalt, gilsonite, rubber, hydrogenated rubber, isomerized rubber, alkyd resins, polybutadiene and polystyrene.

The aforesaid polymers are stabilized preferably just after synthesis. Uncured, the stabilized polymers resist decomposition by heat and/or light and also decomposition resulting from operations that are carried out during the compounding and milling. After such operations the cured polymers, containing the stabilizers, resist further decomposition and retain their strength, elasticity and electric-insulating capacities over a long period with little appreciable impairment in those properties. The stabilized polymer may be cured by the process described in the McAlevy et al. Patent 2,416,060 or by any equivalent process.

We claim:

1. A chlorosulfonated polymer of ethylene stabilized against decomposition by the presence of from 0.01% to 10% by weight of phenyl glycidyl ether.

2. An uncured chlorosulfonated polymer of ethylene stabilized against decomposition by the presence of 0.1% to 10% by weight of phenyl glycidyl ether.

3. A cured chlorosulfonated polymer of ethylene stabilized against decomposition by the presence of 0.1% to 10% by weight of phenyl glycidyl ether.

RICHARD E. BROOKS.
MALCOLM A. SMOOK.

References Cited in the file of this patent

UNITED STATES PATENTS

| Number | Name | Date |
|---|---|---|
| 2,416,061 | McAlevy et al. | Feb. 18, 1947 |

FOREIGN PATENTS

| Number | Country | Date |
|---|---|---|
| 418,230 | Great Britain | Oct. 22, 1934 |